United States Patent [19]

Bauer

[11] 4,301,370

[45] Nov. 17, 1981

[54] FLOWTHROUGH CHAMBER FOR NUCLEAR RADIATION DETECTION FLUIDS

[75] Inventor: Peter Bauer, Munich, Fed. Rep. of Germany

[73] Assignee: Hartmann & Braun AG, Heiligenhaus, Fed. Rep. of Germany

[21] Appl. No.: 927,402

[22] Filed: Jul. 24, 1978

[30] Foreign Application Priority Data

Jul. 18, 1977 [DE] Fed. Rep. of Germany ....... 2732448

[51] Int. Cl.³ ............................................. G01N 21/01
[52] U.S. Cl. ..................................... 250/435; 250/428
[58] Field of Search ............... 250/428, 432, 435, 437, 250/438, 454, 455

[56] References Cited

U.S. PATENT DOCUMENTS

1,038,631 9/1912 Neven .................................. 250/435

FOREIGN PATENT DOCUMENTS

302988 6/1929 United Kingdom ................ 250/428

Primary Examiner—Bruce C. Anderson
Attorney, Agent, or Firm—Smyth, Pavitt, Siegemund & Martella

[57] ABSTRACT

A cylindrical vessel is provided with inlet and outlet tubes extending axis parallel, excentrically and diametrically opposed into the vessel from the top. The tubes have radial apertures and are closed on the bottom. A gamma ray detector sits also on the bottom. Blowing directly against the wall of the vessel is avoided and the resulting flow pattern is vortex-free and laminar to avoid stagnation zones.

6 Claims, 2 Drawing Figures

FLOWTHROUGH CHAMBER FOR NUCLEAR RADIATION DETECTION FLUIDS

BACKGROUND OF THE INVENTION

The present invention relates to a measuring chamber for continuous flow-through of fluids which may contain radioactive isotopes. Such a chamber is part of a detection apparatus for detecting nuclide-specific gamma rays.

The discharge of exhaust air and gases as well as waste water from nuclear reactor plants have to be continuously monitored and supervised with regard to any radioactive contamination. The requisite measurement involves, for example, tapping and branching off a portion of the fluid to be supervised, and passing the branch stream through a measuring chamber which contains a suitable detector. The response time of the measuring device as a whole is the shorter, the shorter the residence time of the fluid in the chamber.

The known devices include a cylindrical measuring chamber having an inlet near the bottom for radial or tangential feed. The measuring fluid is discharged from the top and through an axial outlet. The top is preferably of conical configuration. A device of this type generally is disclosed e.g. by Gebauer in Atomwirtschaft, Mar. 19, 1977, page 150.

This known device is disadvantaged by the fact that the fluid molecules, gas or liquid, travel around the chamber along a very long circuitous path including many round trips around the axis and prior to discharge; their residence time is accordingly quite long. Moreover, it is practically impossible to avoid the formation of a stagnant flow zone which further increases the average residence time. The resulting long residence time is therefor directly responsible for a rather long delay in any indication that e.g. the radioactivity has increased. Moreover, the formation of eddies and stagnation zones contaminates the chamber and raises the zero or average level thereby simulating a higher radioactivity than actually present.

DESCRIPTION OF THE INVENTION

It is an object of the present invention to provide a new and improved flow-through chamber for measuring radioactivity in fluids under conditions in which the residence time of the fluid in the chamber is minimized and the formation of stagnation zones is avoided.

In accordance with the preferred embodiment of the present invention it is suggested to provide a cylindrical vessel with a removable top from which extend two excentrically positioned tubes, being preferably diametrically disposed, one for charging and one for discharging. Both tubes have closed ends near the vessel bottom and lateral bores. The radiation detector is mounted in the vessel e.g. centrally and on the bottom thereof.

It was found that the inlet and outlet of fluid as provided produces a uniform, eddy-free flow pattern in the vessel which fills essentially the entire chamber volume without formation of a dead or stagnant zone.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
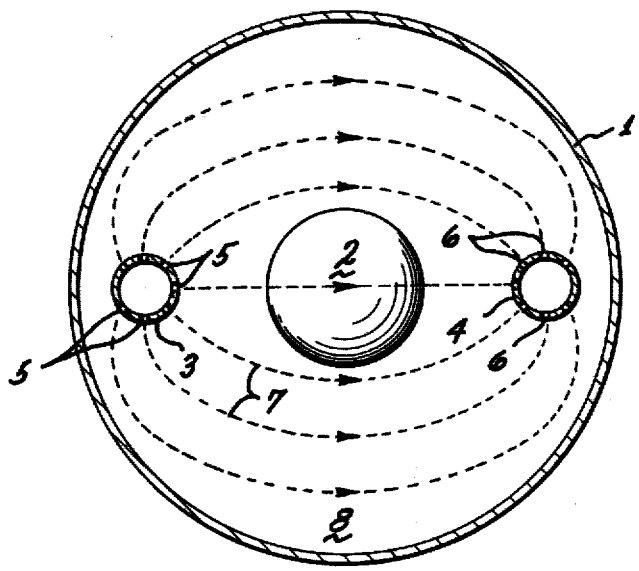
FIG. 1 is a cross section through a measuring chamber in accordance with the preferred embodiment of the present invention.
Figure 2:
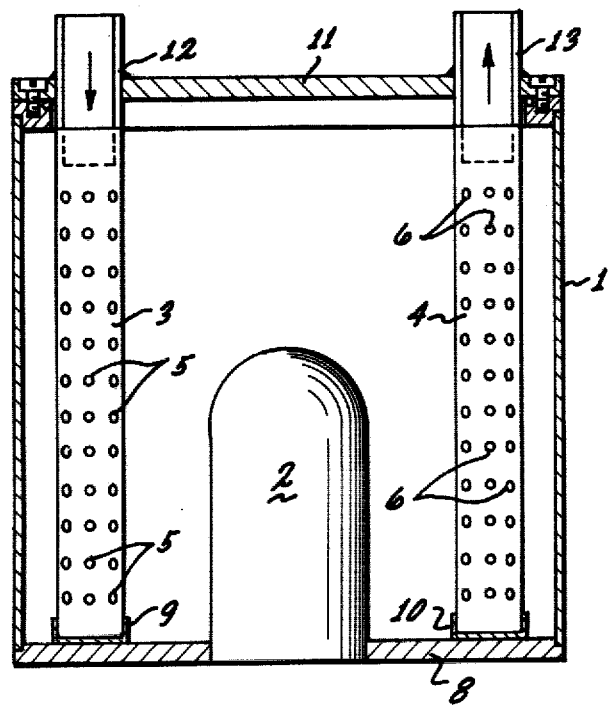
FIG. 2 is a longitudinal section of the chamber.

Proceeding now to the detailed description of the drawings, the measuring chamber illustrated is a vessel which has a cylindrical or tubular wall 1, a bottom plate 8 and a top plate, cover or lid 11. The bottom plate carries a gamma radiation detector 2 being concentrically arranged to the axis of cylinder wall 1. The detector 2 is of conventional construction and responds to nuclide-specific gamma rays that may be produced by contaminants in the fluid passing through the chamber.

Both, an inlet nipple 12 and an outlet nipple 13 are affixed to the top 11. These inlet and outlet tubes or nipples 12, 13 are welded to the cover or top 11. The charge device for the measuring chamber includes an inlet tube 3 which is closed on the bottom by a cap 9. Tube 3 reaches almost bottom plate 8 and cap 9 may actually be on the bottom of the chamber.

The tube 3 is provided with a plurality of radial discharge outlets, bores and apertures 5, distributed over the length of the tube to avoid formation of a stagnant zone. In the vessel the apertures 5 are distributed uniformly over the circumference of the tube except that no outlets face directly the wall 1 at the line of shortest distance from tube 3. Moreover, the axial spacing of the aperture is gradually reduced from the top towards the bottom. Since the pressure reduces in down direction, the volume outflow remains constant. Alternatively, one could provide the tube with axially equidistantly spaced apertures, but provide them with downwardly increasing cross-section. In either case, cross-section of outflow from tube 3, on a per axial unit length basis, increases toward the bottom.

The discharge or outlet path from the interior of the vessel is similarly provided for and disposed in symmetrical relation to the inlet. A tube 4 is diametrically positioned to inlet tube 3 extending axially parallelly thereto. Both tubes are excentrical in relation to the vessel axis but have symmetric positions in relation to each other with respect to that axis. Tube 4 is stuck onto the nipple 13 and closed with a cap 10 near or at the bottom. Tube 4 has apertures 6 arranged similarly to the apertures 5. The arrangement of apertures 5 and 6 is chosen generally to avoid a stagnant flow zone and to set up a laminar flow zone from tube 3 to tube 4. The dashed lines in FIG. 1 are flow lines traversing the interior of the vessel. Blowing gas or fluid directly towards the wall 1 in a head-on stream would introduce turbulence and, possibly, standing vortices could result. Most importantly, however, blowing directly against the walls would actually facilitate depositing any suspended radioactive particles onto the wall 1.

The axial spacing of aperture 6 increases towards the outlet so that the pressure drop compensates the volumetric rate of flow into the tube 4, to be uniform along the extension of the tube. The same alternative is available here, using equidistantly spaced bores which have large diameter towards the bottom, so that generally the per unit length cross-section of inflow into the tube 4 increases towards the bottom.

The flow pattern, as stated, is laminar and contamination by any suspended particles is avoided. The sensitivity of measurement can be increased by increasing the pressure of the fluid as applied, to thereby increase the rate of flow under corresponding decrease in residence time. On the average, the chamber should be operated at a pressure of 5 bars (about 72 psi). In the case of a 20 to 30 liter chamber, residence time can be reduced to less than 20 seconds. This value was obtained by way of actual measurements and tests and is a significant improvement over known chambers.

In order to inhibit, or at least impede, precipitation and depositing of dust or other suspended particles, one should cover all internal surfaces which come in contact with the fluid, by an anti-adhesive plastic. This coating may be sintered onto the several walls and surfaces in the vessel. A suitable material is, for example, polytetrafluorethylene or fluorethylenepropylene.

The measuring chamber has a construction which facilitates assembly as well as disassembly. It should be realized that regular cleaning and decontamination is still necessary, though less frequently than in the case of known devices. The cylindrical wall and bottom 8 may be secured to each other e.g. by welding, etc. However, wall 1 has a top rim to which cover 11 is bolted. As stated, nipples 12 and 13 are welded to the cover 11, but the tubes 3 and 4 are just telescoped over the nipples (or into them if that is desired), and the caps 9 and 10 are just placed onto the lower tube ends. Through proper turning one will orient the tubes 3 and 4 so that none of the bore will face directly the wall 1.

The invention is not limited to the embodiments described above but all changes and modifications thereof not constituting departures from the spirit and scope of the invention are intended to be included.

I claim:

1. Measuring chamber of the flow-through type for fluids which may contain isotopes to be detected by way of radiation detection, comprising:
   a cylindrical vessel having a bottom and a top;
   an inlet tube connected to the top in eccentric relation to the cylindrical configuration of the vessel;
   an outlet tube also connected to the top and in eccentric relation to the cylindrical configuration of the vessel;
   said tubes being closed at their respective bottom ends and each being provided with a plurality of bores respectively as outlets and discharge openings into and from the interior of the vessel such that pressurized fluid under a steady-state condition will flow from said inlet tube to said outlet tube; and
   a radiation detector disposed in the vessel between the tubes.

2. Measuring chamber as in claim 1, said tubes being detachably connected to the top.

3. Measuring chamber as in claim 2, said top having two nipples extending into the chamber, the tubes being stuck onto or into the nipples.

4. Measuring chamber as in claim 1, wherein the apertures in the tubes are provided to obtain an increase in cross-section of through-flow on a per unit axial length basis.

5. Measuring chamber as in claim 1, said apertures in the inlet tube being oriented so that none of them faces the wall of the vessel along a path of smallest distance between the inlet tube and the wall.

6. Measuring chamber as in claim 1, wherein interior surfaces are provided with an anti-adhesive coating.

* * * * *